United States Patent

Robertson et al.

Patent Number: 6,021,169
Date of Patent: Feb. 1, 2000

[54] FEEDWATER CONTROL OVER FULL POWER RANGE FOR PRESSURIZED WATER REACTOR STEAM GENERATORS

[75] Inventors: James E. Robertson, South Glastonbury; Deva R. Chari, Granby; Stephen J. Wilkosz, Vernon, all of Conn.

[73] Assignee: ABB Combustion Engineering Nuclear Power, Inc., Windsor, Conn.

[21] Appl. No.: 09/176,799

[22] Filed: Oct. 22, 1998

[51] Int. Cl.[7] .............................. G21C 7/32; G21C 7/36; G21C 7/00
[52] U.S. Cl. ....................... 376/211; 376/210; 376/216; 376/241; 376/402
[58] Field of Search ................................... 376/210, 211, 376/216, 241, 402

[56] References Cited

U.S. PATENT DOCUMENTS

| 4,104,117 | 8/1978 | Parziale et al. | 376/211 |
| 4,728,481 | 3/1988 | Geets | 376/211 |
| 4,777,009 | 10/1988 | Singh et al. | 376/211 |

Primary Examiner—Charles T. Jordan
Assistant Examiner—Jack Keith
Attorney, Agent, or Firm—Rader, Fishman & Grauer; Ronald P. Kananen

[57] ABSTRACT

A feedwater control system and method for a pressurized water reactor steam generating system having first and second output signals. The first output signal is determined by first and second input signals, and, when combined with a third input signal automatically controls at least one feedwater pump and first designated valves which regulate water flow from the one or more feedwater pumps to a steam generator when a steam generator steam load and reactor are operating at a first predetermined power level. The first input signal is determined by a downcomer feedwater flow differential pressure. The second input signal is determined by a reactor power level. The third input signal is determined by a steam generator level. The second output signal, determined by a steam generator water level, automatically controls at least one startup feedwater control valve when the steam generator steam load and the reactor are operating at a second predetermined power level. In a preferred embodiment, the first designated valves include at least one economizer feedwater control valve and at least one downcomer feedwater control valve. Also, in a preferred embodiment, the first predetermined power level is between about 5 and about 20 percent, and the second predetermined power level is between zero and about 5 percent.

9 Claims, 2 Drawing Sheets

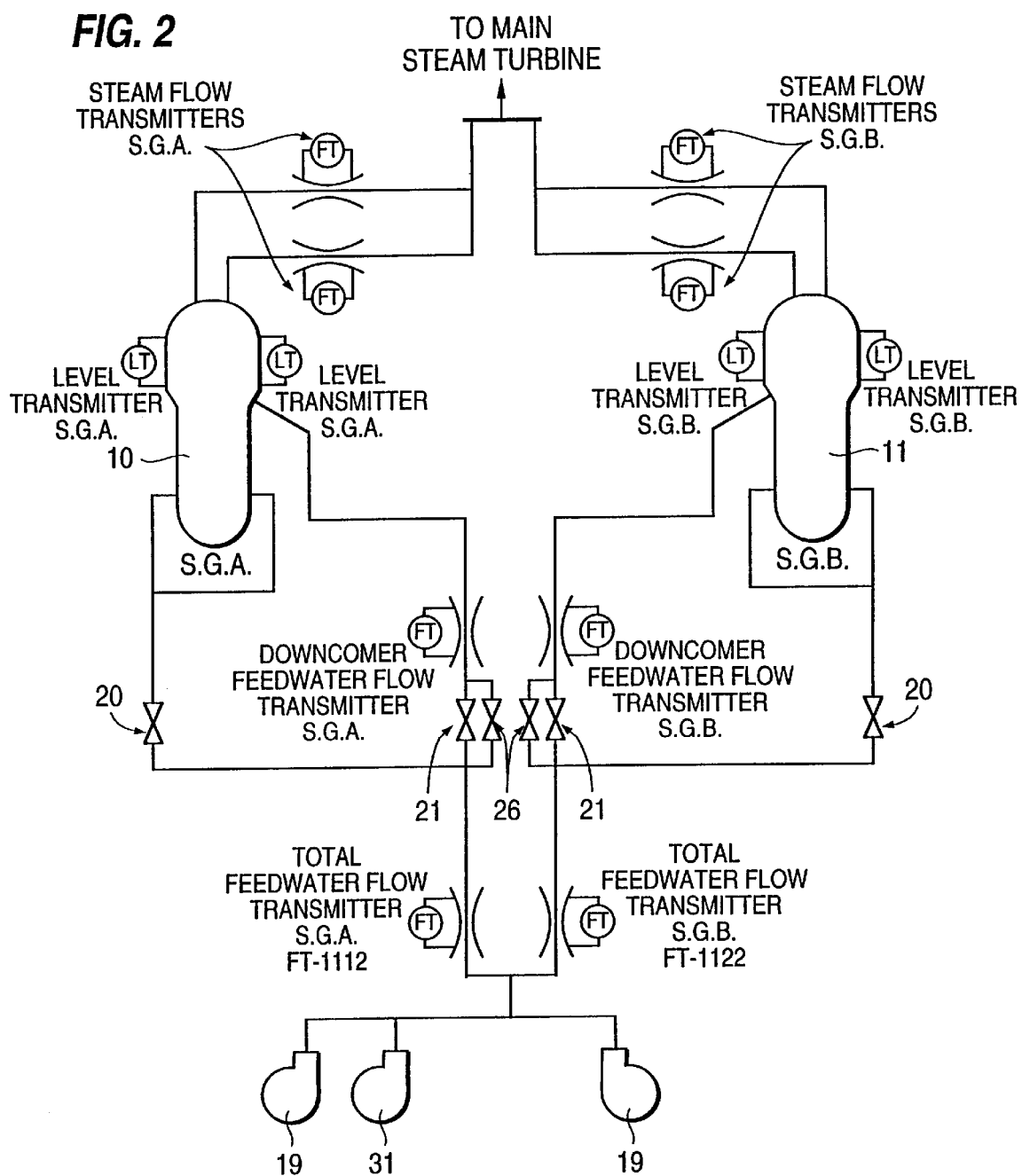

FEEDWATER CONTROL OVER FULL POWER RANGE FOR PRESSURIZED WATER REACTOR STEAM GENERATORS

BACKGROUND OF THE INVENTION

The current System 80+ Feedwater Control System (FWCS) automatically controls the feedwater flow to the steam generators between 5% and 100% power. However, feedwater control below 5% power is a manual operation. The current FWCS uses input signals of steam flow rate, feedwater flow rate, and steam generator level to develop output signals that control the position of the feedwater valves and the speed of the feedwater pumps.

There is a large economizer feedwater valve, a small downcomer feedwater valve and a very small startup feedwater valves. The startup feedwater control valve is located in parallel with the downcomer feedwater valves. The large economizer feedwater valve is automatically controlled by the above three signals of the FWCS between 20% and 100% power. Also, the small downcomer feedwater valve is automatically controlled by the steam generator level signal of the FWCS between 5% and 20% power. Furthermore, the very small startup feedwater valve is manually controlled by an operator when the power level is between 0% and 5%.

It is an object of the present invention to simplify the FWCS design, which previously had two automatically functioning systems, and one manually functioning system, according to the existing power levels. It is another object of the present invention to provide a more reliable feedwater system than is currently provided, especially with the System 80+ Feedwater Control System, by using additional input signals when the power level is between 5% and 20%, and by increasing the automatic feedwater control operating range, thereby relieving operators of monitoring and operating of the FWCS at operation power levels below 5%.

SUMMARY OF THE INVENTION

The above-described needs and others are met by a feedwater control system for a pressurized water reactor steam generating system, which includes a first input signal, which is determined by a downcomer feedwater flow differential pressure, a second input signal, which is determined by a reactor power level, a first output signal, which is determined by the first and second input signals, and, when combined with a third input signal which is determined by a steam generator level, which automatically controls at least one feedwater pump and designated valves which regulate water flow from the one or more feedwater pumps, to a steam generator, when a steam generator steam load and a reactor are operating at a first predetermined power level, and a second output signal, determined by a steam generator water level, which automatically controls at least one startup feedwater control valve when the steam generator steam load and the reactor are operating at a second predetermined power level.

In a preferred embodiment of the invention, the first predetermined power level is between about 5 and about 20 percent, and the second predetermined power level is between zero and about 5 percent. Also in a preferred embodiment of the invention, the first designated valves include at least one economizer feedwater control valve, and at least one downcomer feedwater control valve.

Furthermore, in a preferred embodiment of the invention, the startup feedwater control valve stops controlling feedwater at the first predetermined power level, and the feedwater control system includes a delay device, in series with the second output signal. The delay device ensures that the startup feedwater control valve does not reach a closed state until the downcomer valve reaches an opened state, thereby ensuring continuous feedwater supply to the steam generators.

The above objects and others are also provided by a method of controlling a feedwater supply to a steam generator in a pressurized water reactor, which includes the steps of providing a first input signal which is determined by a downcomer feedwater flow differential pressure, and providing a second input signal which is determined by a reactor power level. The method also includes the steps of automatically controlling at least one feedwater pump and a designated set of valves which regulate water flow from the one or more feedwater pumps to a steam generator, using a first output signal which is determined by the first and second input signals and combined with a third input signal which is determined by a steam generator level, when a steam generator steam load and a reactor are operating at a first predetermined power level, and automatically controlling at least one startup feedwater control valve, using a second output signal which is determined by a steam generator water level, when the steam generator steam load and the reactor are operating at a second predetermined power level.

As noted before, in a preferred embodiment of the invention, the first predetermined power level is between about 5 and about 20 percent, and the second predetermined power level is between zero and about 5 percent. Also in a preferred embodiment of the invention, the first designated valves include at least one economizer feedwater control valve, and at least one downcomer feedwater control valve. The method can also include the steps of providing a signal to close the startup feedwater control valve at the first predetermined power level, providing a delay device to the second output signal, and automatically operating the delayer to ensure that the startup feedwater control valve does not reach a closed state until the downcomer valve reaches an opened state.

BRIEF DESCRIPTION OF THE DRAWINGS

FIG. 2 shows feedwater flow paths with flow and level transmitters, according to the principles of the present invention.

DESCRIPTION OF THE PREFERRED EMBODIMENT

Figure 1:
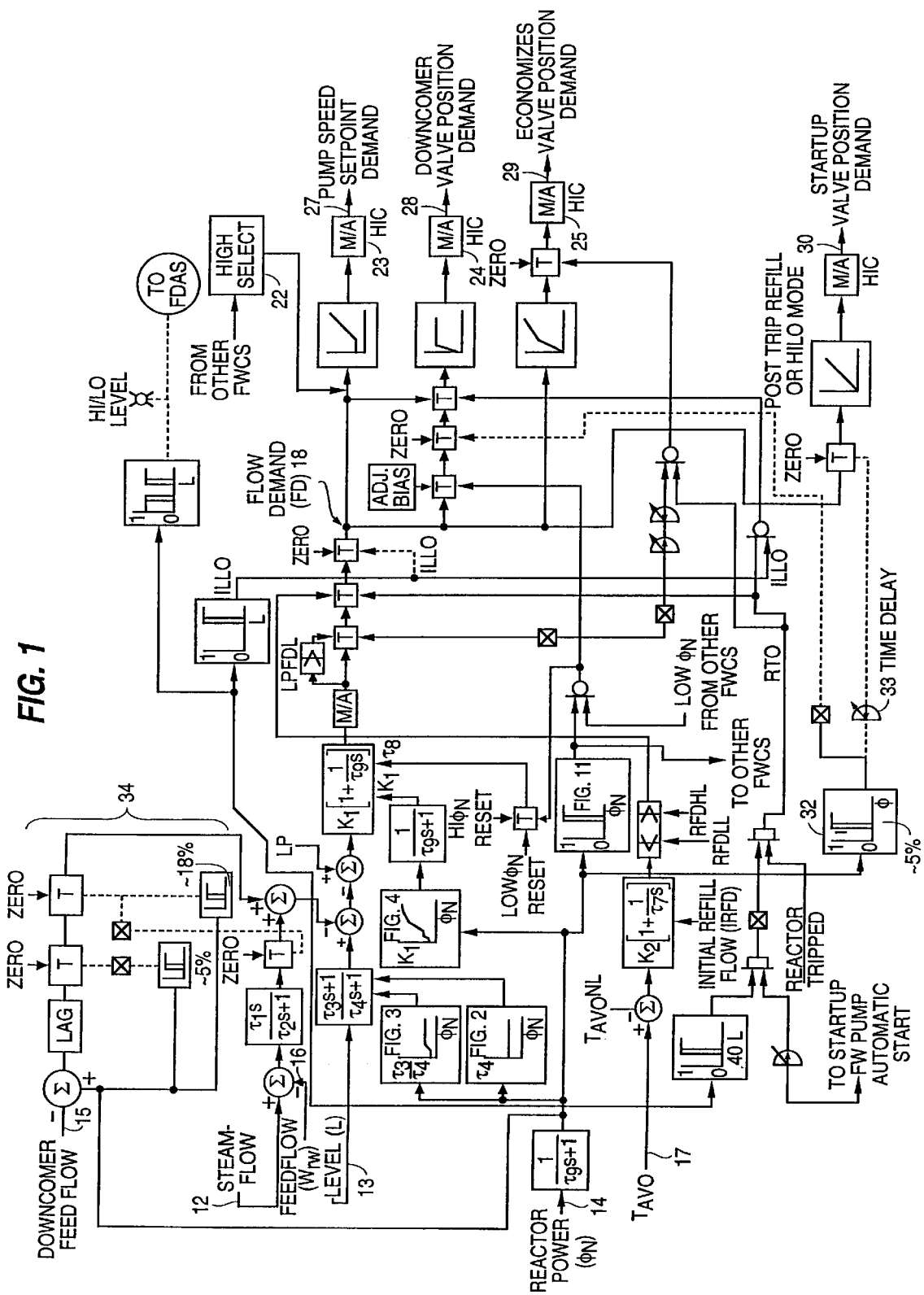
FIG. 1 shows a functional configuration for extended range automatic feedwater control, according to the principles of the present invention.

The above described needs are met by a system wherein automatic control of feedwater flow to pressurized water reactor (PWR) steam generators is enabled, over the full range of reactor power from 0 percent to 100 percent. FIG. 1 shows a functional configuration of a Nuclear Power Feedwater Control System (FWCS) with the features that enable such control.

Two nearly identical FWCS's, one for steam generator A 10 and one for steam generator B 11, are provided with a steam supply system such as an ABB Combustion Engineering Nuclear Power (ABB-CENP) nuclear steam supply system. Either FWCS is exemplified by FIG. 1. The FWCS's control feedwater flow by processing signals from the transmitters and controlling the pumps and valves shown in FIG. 2.

First, each FWCS receives input signals from various sources, the signals being numerically represented in FIG. 1.

These signals convey data involving the total feedwater flow differential pressure (DP) 16, the downcomer feedwater flow DP 15, the steam flow DP 12, the steam generator level 13, the reactor power 14, and the reactor coolant system average temperature instrument channels 17.

Upon receiving and processing these signals, each FWCS generates an output flow demand (FD) signal 18. The FD signal is processed into output signals 27, 28, 29 that are respectively received by the feedwater pumps 19, the economizer feedwater control valves 20, and the downcomer feedwater control valves 21.

A high speed logic processor 22 also receives the FD signal from each FWCS, and sends the FD to the other FWCS. The FD is processed by the high speed logic processor, and used to determine the pump speed demand.

Manual/automatic control stations 23, 24, 25, for the feedwater pumps, downcomer feedwater control valves, and economizer control valves, respectively, are placed in automatic mode when the FWCS determines the output demand signals based on the input signals. When any one of the manual/automatic control stations 23, 24, 25 are placed in manual mode, its output signal is determined and controlled by an operator.

Each FWCS can be placed in automatic mode when the feedwater pumps are running and the control valves can control feedwater flow such that stable SG water level is maintained. However, for existing FWCS's, such as the ABB-CENP FWCS, reactor power and steam load must be approximately 5% or greater, typically 15 to 20%, to establish these conditions.

In order to provide automatic control of SG water level when the reactor power and steam load are below 5%, a new output signal 30 is provided for each startup feedwater control valve 26. The startup feedwater control valves are automatically controlled, based on the SG water level, from 0 percent power up to the lower range of the existing FWCS, which in the preferred embodiment is approximately 5%, although the principle of the invention is applicable to situations where the lower power level is higher or lower than 5%. In this embodiment, however, during operation between 0 and 5% power, the constant speed startup feedwater pump 31 is the expected source of flow. Because the pump 31 runs at constant speed, no automatic control signal is needed.

Transfer of flow control from the startup feedwater control valves 26 to the downcomer feedwater control valves 21, at 5% power in the preferred embodiment of the invention, will occur at a point of change of an output state in a bistable 32. Also, a time delay 33 is added to the output signal 30 for the startup valves 26, so that they will close after the downcomer valves 21 open. Because there is a time delay in complete shutdown of the startup valves 26, continuous feedwater flow to the steam generators 10, 11 is assured.

The present invention also improves the control of supply to the steam generators 10, 11 between 5 and 15% power. In existing systems, a bistable triggered by the reactor power level signal 14 introduces the steam flow 12 and total feedwater flow DP 16 input signals to the FWCS logic. Use of these signals with the steam generator water level signal 13 is sometimes called 3-element control. The present invention makes use of the downcomer feedwater flow DP signal 15, used only for indication in the existing FWCS's. The present invention also makes use of the reactor power input signal 14, used for transfer and lead/lag logic in the existing FWCS's. Using these available signals, a new 3-element control scheme 34 is provided, at lower power levels. At higher power levels, between 15 and 20%, the new 3-element control scheme 34 switches from the new downcomer feedwater flow-reactor power-steam-generator level combination to the existing total feedwater flow-steam flow-steam-generator level scheme.

Having described an embodiment of the invention, it is to be understood that the invention is not limited to any of the precise embodiments described herein. Various changes and modifications could be effected by one skilled in the art without departing from the spirit or scope of the invention as defined in the appended claims.

What is claimed is:

1. A feedwater control system for a pressurized water steam generating system, which comprises:

a first input signal, determined by a downcomer feedwater flow differential pressure;

a second input signal, determined by a reactor power level;

a first output signal, determined by said first and second input signals, which, when combined with a third input signal which is determined by a steam generator level, automatically controls at least one feedwater pump and first valves that comprise at least one economizer feedwater control valve, and at least one downcomer feedwater control valve, and regulate water flow from said at least one feedwater pump to a steam generator, when a steam generator steam load and a reactor are operating at a first predetermined power level; and a second output signal, determined by a steam generator water level, which automatically controls at least one startup feedwater control valve when said steam generator steam load and said reactor are operating at a second predetermined power level.

2. A feedwater control system as claimed in claim 1, wherein said startup feedwater control valve stops controlling feedwater at said first predetermined power level, and wherein said feedwater control system further comprises a delayer, added to said second output signal, which ensures that said startup feedwater control valve does not reach a closed state until said downcomer valve reaches an opened state.

3. A feedwater control system as claimed in claim 1, wherein said first predetermined power level is between about 5 and about 20 percent.

4. A feedwater control system as claimed in claim 1, wherein said second predetermined power level is between zero and about 5 percent.

5. A method of controlling feedwater supply to a steam generator in a pressurized water reactor, which comprises the steps of:

providing a first input signal, determined by a downcomer feedwater flow differential pressure;

providing a second input signal, determined by a reactor power level;

automatically controlling at least one feedwater pump and first valves that comprise at least one economizer feedwater control valve, and at least one downcomer feedwater control valve, and regulate water flow from said at least one feedwater pump to a steam generator, using a first output signal, determined by said first and second input signals when combined with a third input signal which is determined by a steam generator level, when a steam generator steam load and a reactor are operating at a first predetermined power level; and automatically controlling at least one startup feedwater control valve, using a second output signal, determined by a steam generator water level, when said steam generator steam load and said reactor are operating at a second predetermined power level.

6. A method as claimed in claim 5, further comprising the step of:

providing a signal to close said startup feedwater control valve at said first predetermined power level.

7. A method as claimed in claim 6, further comprising the steps of:

providing a delayer to said second output signal; and automatically operating said delayer to ensure that said startup feedwater control valve does not reach a closed state until said downcomer valve reaches an opened state.

8. A method as claimed in claim 5, wherein said first predetermined power level is between about 5 and about 20 percent.

9. A method as claimed in claim 5, wherein said second predetermined power level is between zero and about 5 percent.

* * * * *